July 29, 1947.  C. C. PIERCE, JR  2,424,945
FILM SLIDE PROJECTION APPARATUS
Filed Aug. 31, 1944  2 Sheets-Sheet 1

Inventor
Carleton C. Pierce Jr.
Attorneys

July 29, 1947.   C. C. PIERCE, JR   2,424,945
FILM SLIDE PROJECTION APPARATUS
Filed Aug. 31, 1944   2 Sheets-Sheet 2

Inventor
Carleton C. Pierce Jr.

Attorneys

UNITED STATES PATENT OFFICE 2,424,945

FILM SLIDE PROJECTION APPARATUS

Carleton C. Pierce, Jr., Washington, D. C.

Application August 31, 1944, Serial No. 552,043

6 Claims. (Cl. 88—28)

This invention relates to projection apparatus for slide films and has as an object to provide simple and effective means for the feed of the film and the timed control of the usual clamping means between which the film is clamped for projection. Another object is to provide for the automatically recurring advance of the film frame by frame, or, alternatively, for the control of the feed by an operator from a remote point. How these and other objects are attainable will be described with reference to the embodiment shown by way of example in the accompanying drawings, in which Figure 1 is a somewhat diagrammatic side elevation of the new apparatus.

Figure 1:
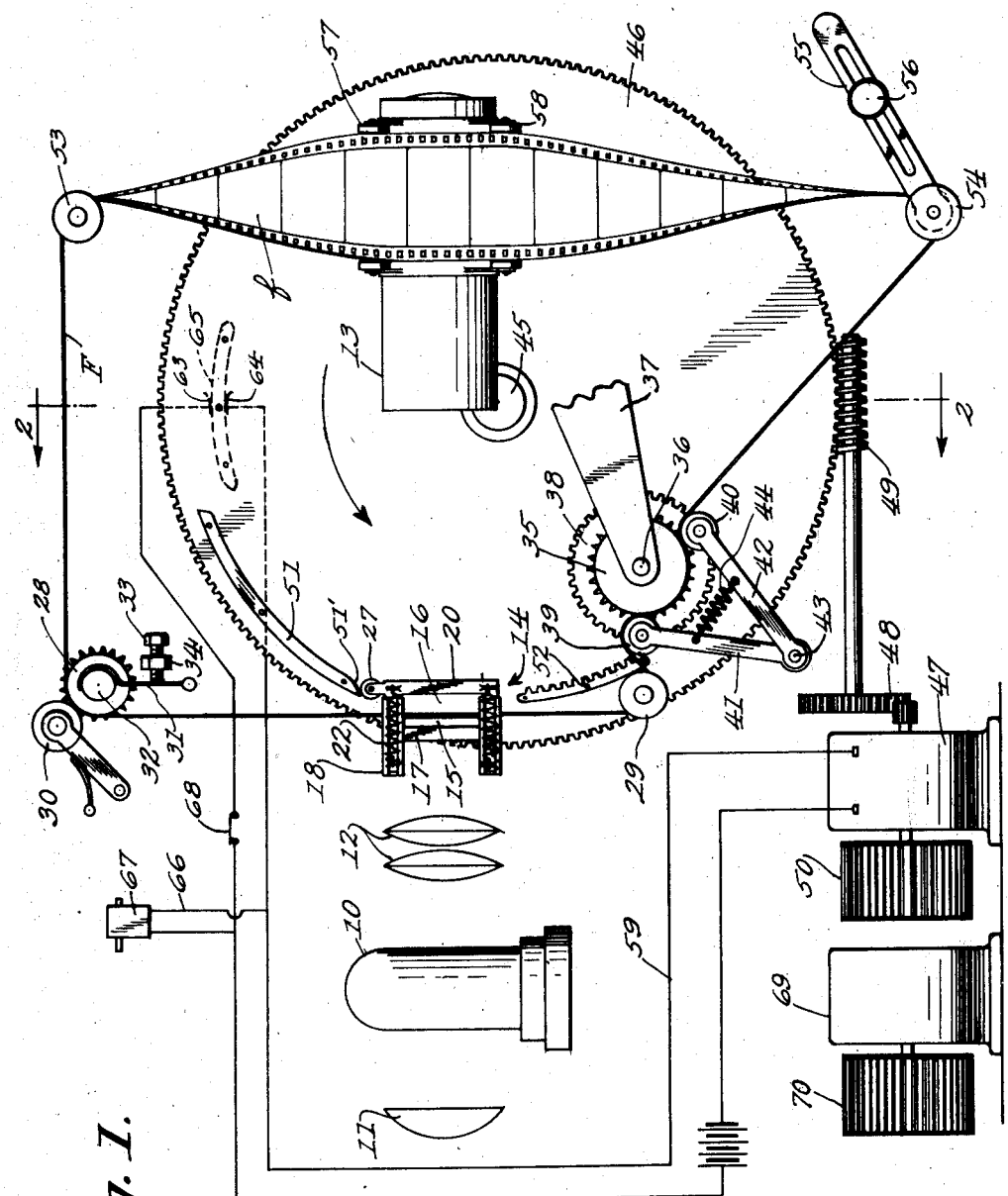

Referring to the drawings, reference numeral 10 designates an electric lamp disposed between a reflector 11 and condensing lenses 12 which are disposed coaxially with each other and with a projecting lens assembly 13, all of these elements being of conventional design.

Disposed between the condensing and projecting lenses is a clamping unit 14 which comprises fixed and movable clamping members 15 and 16, here shown as rectangular glass plates. Member 15 is supported in a metal frame 17 which in turn is fixedly supported in any suitable manner so that the face of member 15 which is adjacent to member 16 is in a vertical plane. The frame 17 supports four horizontal guide channels 18 which slidably receive arms 19 which at one end are fixed to a metal frame 20 which carries member 16. Struck from the sides of frame 20 are fingers 21 over which are hooked the ends of tension springs 22 whose other ends are hooked over fingers 23 provided at the ends of channels 18 remote from member 16, the springs normally pulling member 16 flatly against member 15. The springs can be unhooked so that the guide arms 19 can be pulled out of the channels to permit the placing of the film where the latter is in the form of an endless band. Ears 24 and 25 on top of frame 20 support a horizontal spindle 26 which on its right hand end, Figure 2, carries a roller 27 constituting a cam follower, as will be hereinafter explained.

Reference numerals 28 and 29 designate film guide rollers, respectively above and below the clamping unit and arranged tangentially with respect to the vertical face of member 15 which is adjacent member 16. Member 28 is constituted as a sprocket provided with teeth adapted to engage the film, which latter is held in engagement with the teeth by a pressure roller 30 of usual design. Reference numeral 31 designates a spring brake finger engaging a drum portion 32 on sprocket 28, the spring having a bias away from the drum portion but being adjustably engageable with the latter by means of a thrust member 33 threaded in a supporting portion 34.

Figure 2:
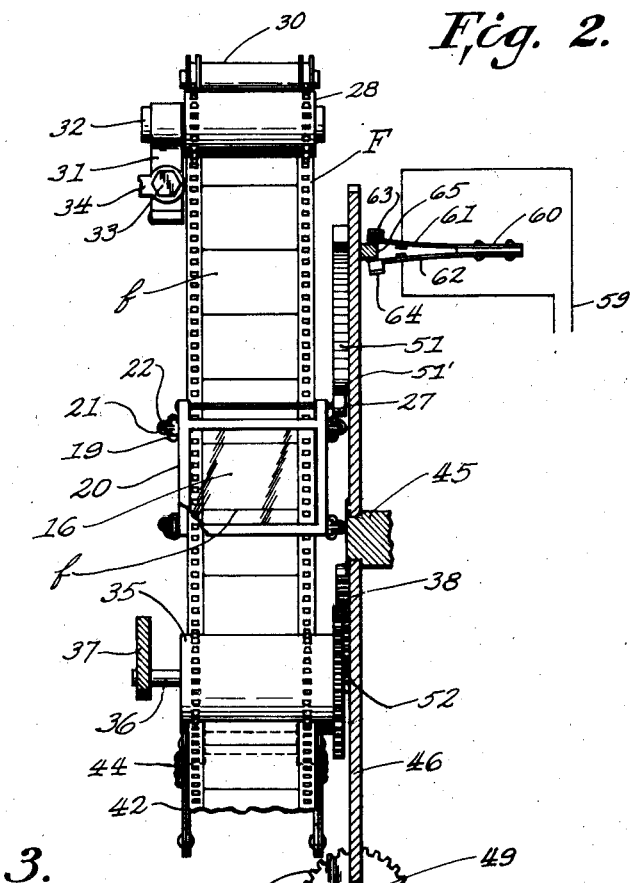
Figure 2 is a section on line 2—2 of Figure 1.
Figure 3:
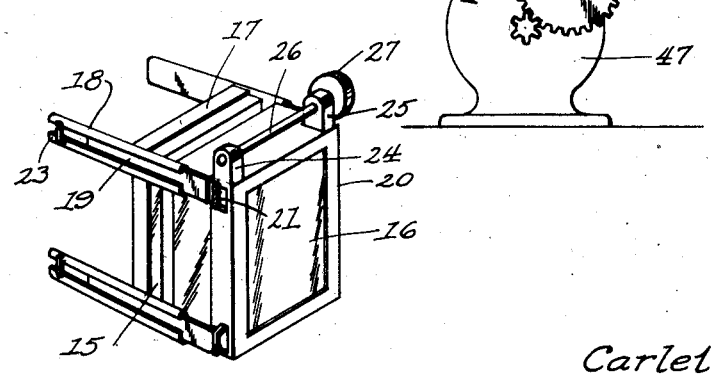
Figure 3 is an isometric view of film-clamping means which appear in elevation in Figures 1 and 2.

To the right of idler 29, Figure 1, is a film feed roller 35 in the form of a sprocket. The sprocket is rotatable on a spindle 36 which is parallel to spindle 26 and is supported by a single arm 37 which lies to the left of the sprocket as seen in Figure 2. In the plane of the cam follower roller 27 the sprocket 35 has fixed thereto a gear 38. Cooperating with the sprocket is a pair of pressure rollers 39 and 40, like roller 30, mounted on the ends of arms 40 and 42 which are pivoted at 43 on a fixed axis parallel to spindle 36, the arms being pulled together by a tension spring 44 to engage the pressure rollers with the feed roller.

Pivoted on a pin or stud 45 parallel to spindles 26 and 36, is a worm wheel 46 whose periphery extends beyond the said spindles. The worm wheel is drivable from a motor 47 through reduction gearing 48 and a worm 49, the motor also driving a turbofan 50 for cooling the apparatus. Fixed on the front of wheel 46, Figure 1, is an arcuate cam member 51 having a bevelled nose portion 51' adapted to engage the follower 27, upon rotation of wheel 46 in the direction of the arrow, so as to move member 16 away from member 15 and hold it away for the length of the cam. Also fixed on the face of wheel 46 is an arcuate series of gear teeth 52 whose radial distance from the axis of wheel 46 is sufficiently different from that of cam member 51 so that the teeth will not interfere with the follower 27. The teeth 52 are adapted to engage gear 38 and the number of teeth 52 in relation of number of teeth of gear 38 and to the length of the frames, is such that each time the total series of teeth 52 engages and disengages gear 38 during rotation of wheel 46, sprocket 35 will be driven through an angle which is sufficient to advance the film exactly one frame. The disposition of the cam member 51 relative to the series of teeth 52 and the length of the cam are such that just prior to the engagement of the leading tooth 52 with gear 38, the cam member will engage the follower to move clamp member 16 away from 15 and that the follower will be released by the cam member just after the final tooth 52 has left gear 38, member 16 being then returned to clamping relation by the springs 22.

As here shown, the film F is endless and is led over guide rollers 53 and 54 of which the latter is supported by a longitudinally slotted arm 55 through a clamp screw 56, the film being guided laterally past the projector lens assembly 13 by means of guide rollers 57 and 58 mounted on the latter. Or rollers 53 and 54 may merely be suitably angled in order to clear the projector lens 13 without too much strain on the film. In order to mount the film, member 16 is removed in the manner heretofore described, press rollers 30, 39 and 40 are released, and, screw 56 being loosened, roller 54 is swung up somewhat. After the film has been mounted, rollers 30, 39 and 40 are released, roller 54 is moved downwardly so as to tension the film properly, the screw 56 is tightened, and member 16 is replaced. The guide rollers can be mounted on forwardly projecting (Figure 1) studs so as to facilitate the mounting of the film.

With motor 47 running continuously, wheel 46 will be continuously driven at considerably reduced speed as determined by the motor speed, reduction gearing 48, and the pitch of the worm and worm wheel. At each rotation of the wheel the clamping members will be released, the film will be fed the space of a frame f, and then the clamping members will be engaged in order to hold the frame flat for projection. Due to the fact that the drive teeth 52 revolve at slow speed, coming around, for example, once every ten seconds, there is little chance of over-travel of the feed roll 35. However, in order to prevent any possibility of any such occurrence, I preferably place a braking means at some point in the drive or guide system so as to be able to place a controlled drag on the film. As here shown, adjustable braking action is applicable to the guide sprocket 28.

Obviously, if a shorter exposure is desired for the frames, another set (or sets) of cam and toothed members 51 and 52 can be applied to wheel 46 by being simply screwed on in the proper relation.

The electrical supply circuit 59 for the motor 47 includes, as here shown, a fixedly mounted switch 60 comprising spring arms 61 and 62 which are normally in contact with each other, the arms having divergent wings 63 and 64 positioned to be engaged and separated by an insulated arcuate breaker 65 screwed on the back of wheel 46. A shunt 66 is connected across switch 60 and includes an on-and-of switch 67. Also, a switch 68 may be interposed in the circuit between the shunt and the switch 60. In Figure 1, breaker 65 is shown as separating the switch arms 61 and 62. Switch 67 is assumed to be open while switch 68 is shown as being closed, and under these circumstances motor 47 is at rest. Upon closing switch 67 the motor will be started, the film released and advanced, and if, after breaker 65 has permitted switch 60 to close, switch 67 is opened, the wheel 46 will continue to rotate until breaker 65 again opens switch 60. As the motor runs down there is of course a slightly continued drive or over-run of wheel 46 and this is taken account of in placing elements 51 and 52 so as to be sure that they will have come to rest before, and preferably just before, the next action will have begun. Member 65 is of sufficient length to assure that switch 60 will be maintained open while and after wheel 46 comes to rest.

Motor 47 can be stopped at any point when switch 60 is closed, by opening both of switches 67 and 68. With the manual control in operation, fan 50 is of course out of operation when the supply circuit 59 is broken. Since lamp 10 is in continuous operation, I provide a continuously running motor 69 driving a turbofan 70 for cooling the apparatus under these circumstances. Of course, if switches 67 and 68 are kept closed, the breaker 65 will be without effect and the film will be intermittently advanced until one of the switches 67 or 68 is opened. In case it is not desired to utilize the control afforded by switch 60 and breaker 65, the latter can be removed and switch 68 opened, thus placing motor 47 under the sole control of switch 67.

It will be seen that the revoluble cam member 51 and drive member 52 have a fixed relationship assuring the proper timing of the camming and driving actions, which relationship is most simply achieved by mounting the members, as herein disclosed, on a common rotary member. With switch 60 out of operation, the film will be advanced at predetermined equal intervals as long as switch 67 is closed. If, for any reason, it should be desired to hold the frames for periods longer than that allowed in automatic changing, the operator can control the projection period at will by the use of switches 60 and 67. In the latter circumstance, switch 60 can cause wheel 46 to stop just before the next change is to be made, so that when the operator closes switch 67 the next frame will immediately come into position for projection.

It will be understood that the invention is susceptible of varied embodiment and that consequently I do not limit myself to the herein disclosed form and arrangement of parts except as in the following claims.

I claim:

1. Projection apparatus for a slide film, comprising a feed roller for the film, means including a revoluble drive member for intermittently driving said roller whereby to feed said film a frame at a time, clamping means comprising two members between which the film passes for projection and of which one is movable to and away from clamping relation to the other, a revoluble cam member, a follower for said cam member in connection with said movable clamping member and intermittently engageable by said cam member to move said movable clamping member away from the other clamping member, return means for said movable clamping member, and means for driving said revoluble members in a constant relation comprising a rotary member on which said drive member and cam member are both mounted, said cam member having an action beginning just before the driving action of said drive member and ending immediately thereafter.

2. Apparatus according to claim 1 including a motor as the drive means, means on said rotary member acting to interrupt the drive between the actions of said cam member, and manual means for restoring the drive.

3. Apparatus according to claim 1 including an electric motor as the drive means for said revoluble means, supply circuit means for said motor including a normally closed switch, means on said rotary member acting to open said switch between the actions of said cam member, a shunt across said switch, and a manually operable switch in said shunt.

4. Projection apparatus for a slide film, comprising a feed roller for the film, a gear arranged to drive said roller, a rotary member having thereon an arcuate series of teeth arranged to engage said gear periodically during rotation of said rotary member whereby to intermittently drive said gear, the number of the teeth of said series being such in relation to the number of the teeth of said gear that each drive of the latter causes said roller to advance said film by a frame, clamping means comprising a fixed and a movable member between which the film passes for projection and of which one is movable to and away from clamping relation to the other, an arcuate cam member on said rotary member, a follower for said cam member in connection with said movable clamping member and intermittently engageable by said cam member to move said movable clamping member away from the other clamping member, and return means for said movable clamping member, said cam member and follower being so disposed and the length of said cam member being such that the cam action begins just before the driving action of said series of teeth and ends immediately thereafter.

5. Apparatus according to claim 4 including an electric motor as the drive means for said rotary means, supply circuit means for said motor including a normally closed switch, means driven by said rotary means to cause the opening of said switch between the actions of said cam member, a shunt across said switch, and a manually operable switch in said shunt.

6. Apparatus according to claim 4 including a motor as the drive means, means controlled from said rotary member for interrupting the drive between the actions of said cam member, and manual means for restoring the drive.

CARLETON C. PIERCE, Jr.

REFERENCES CITED

The following references are of record in the file of this patent:

UNITED STATES PATENTS

| Number | Name | Date |
| --- | --- | --- |
| 1,221,515 | Davidson | Apr. 3, 1917 |
| 1,153,341 | Ryan | Sept. 14, 1915 |
| 1,474,388 | Stegman | Nov. 20, 1923 |
| 2,299,973 | Getten | Oct. 27, 1942 |
| 1,937,326 | Peck | Nov. 28, 1933 |
| 1,943,303 | Foster | Jan. 16, 1934 |
| 1,206,984 | Bloom | Dec. 5, 1916 |